July 14, 1936.  A. L. FREEDLANDER  2,047,624
PRINTER'S PLATE
Filed Sept. 4, 1934
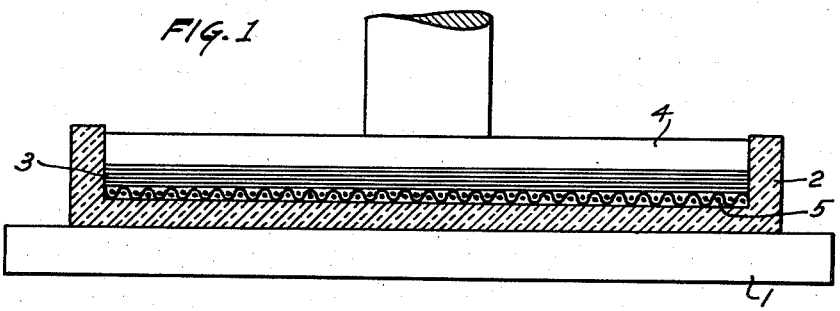
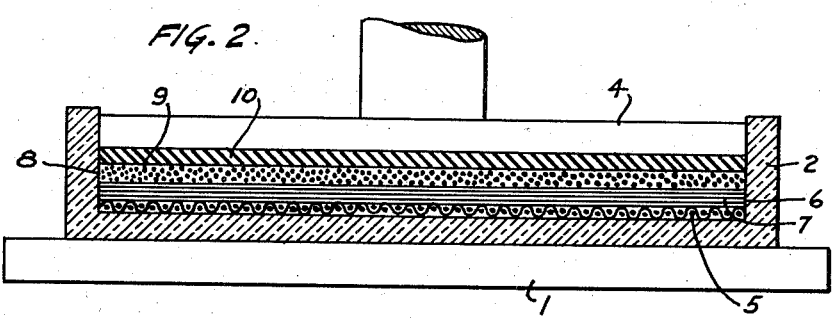
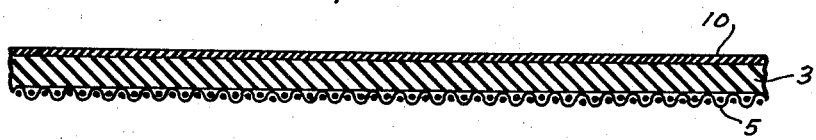
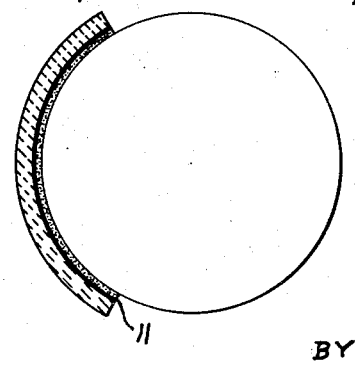
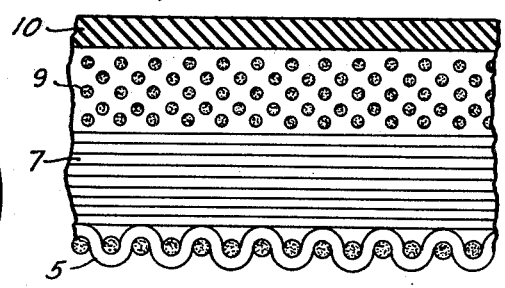
INVENTOR
ABRAHAM L. FREEDLANDER.
BY Toulmin & Toulmin
ATTORNEYS.

Patented July 14, 1936

2,047,624

UNITED STATES PATENT OFFICE 2,047,624

PRINTER'S PLATE

Abraham L. Freedlander, Dayton, Ohio, assignor to The Dayton Rubber Manufacturing Company, Dayton, Ohio, a corporation of Ohio Application September 4, 1934, Serial No. 742,574

12 Claims. (Cl. 41—25)

My invention relates to rubber printing plates.

It is the object of my invention to provide a non-shrinking rubber printing plate.

Heretofore, all attempts to make rubber printing plates have failed in their practical application due to the difficulty of controlling the expansion and contraction of the rubber. Rubber printing plates shrink and this characteristic has made them a failure.

By my invention I provide a non-shrinking rubber plate by controlling the direction of the fiber reinforcement and so arranging the direction of the fiber reinforcement as to prevent shrinkage in any direction.

It is a further object to provide a surface for this non-shrinking rubber plate which is impervious to changes in temperature and moisture and to the acids, solvents and inks used in printing processes.

It is also an object to provide a face for the plate which is hard and smooth, that is impervious to the effect of the ink and associated chemicals.

It is an object to provide a printing plate which will give a sharp, clear impression and eliminate any blurred effect as the result of using a fiber reinforcement.

It is a further object to reinforce and back the plate with pre-shrunk fabric.

It is a further object to provide a rubber plate that can be attached to a cylinder or other supporting body with satisfactory adhesion and at the same time provide an attachment that is uniform in thickness so as not to disturb the thickness of the plate.

It is a further object to provide a printing plate that can be made partly of rubber and partly of non-rubber material, such as synthetic resin, or made entirely of synthetic resin in combination with the fiber and fabric reinforcements heretofore mentioned.

Referring to the drawing:

Figure 1 is a section through a type mold showing the formation of the surface of the plate of my invention;

Figure 2 is a section through a preferred form of plate;

Figure 3 is an alternative view in an alternative form showing the use of rubber with a non-rubber coating;

Figure 4 is a section through a printing cylinder and a printing plate showing the thermo plastic mounting of the plate on the cylinder;

Figure 5 is an enlarged section of the plate of Figure 2.

Referring to the drawing in detail, I designates a bed carrying a mold of suitable material, such as bakelite, designated 2. Mounted in this mold is the rubber plate of my invention designated 3 which is receiving a type impression under hydraulic pressure from the type face 4.

The rubber plate itself is formed as follows: a pre-shrunk fabric backing 5 is coated with a layer of either rubber or non-rubber material having fibers arranged all in the same direction. This layer is indicated at 6 and the fibers at 7. Superimposed on this layer is a second layer of either rubber or non-rubber material designated 8 having fibers mixed therein and arranged all in one direction as at 9 at right angles to the fiber 7. This prevents the plate from shrinking as the material mixed with the fibers in a given direction will not shrink in the direction of the fibers (Figure 5). There is then mounted, if desired, a coating either of rubber or non-rubber at 10. The whole can be vulcanized in the usual manner.

If desired, the reinforcing backing 5 can be eliminated. If rubber is used, the coating 10 may be of non-rubber material, such as synthetic resin; I prefer a so-called synthetic rubber material.

For instance, the material divinyl acetylene which results from the vinyl derivatives of acetylene is prepared by reacting acetylene in the presence of a non-alkali catalyst comprising cuprous chloride. A non-benzenoid polymer of acetylene having the empirical formula $C_8H_8$ may be employed. A pre-formed drying oil which is a liquid, non-volatile polymerization product of acetylene may be used. This rubber-like material may be referred to briefly as a class of material as a divinyl acetylene polymer. Isoprene on standing, passes slowly into an elastic solid having the chemical composition and many of the chemical reactions of rubber but is resistant to the attack of oils and acids. I also desire to comprehend the use of polymethylene-sulfide, a polysulfide reaction product. I also comprehend the use of a plastic polymer chloroprene (reaction product of monovinylacetylene and hydrochloric acid); or polychloroprene and polybromoprene.

I have found that by controlling the direction of the fibers I control the shrinking and the direction in which the fibers lay and by providing layers of rubber or non-rubber material with fibers all in one direction and arranging the layers with the fibers in different directions, that is, by crossing the direction of the fibers, I can stop the shrinkage in both directions.

I prefer that the relatively thin layer 10 which is the ply of rubber next to the letters of the mold in molding should be harder than the rest of the stock or the relatively hard smooth synthetic rubber or synthetic resin compound can be employed. By using the synthetic materials I prevent the ink from having any effect on the ply. It also gives a smoother printing effect as it prevents any blurring by reason of the presence of the fibers in the surface layer.

The backing of the plate with the pre-shrunk fabric is an important feature of the process and resulting product.

When it is desired to make rubber printing plates to be attached to base plates and cylinders as shown in Figure 4 I find that it is important that good adhesion be obtained to the cylinder and at the same time whatever coating is used on the cylinder must be very uniform so as not to disturb the thickness of the plate.

I, therefore, employ a thermo plastic cement 11 (Figure 4). This will hold the plate tight enough. At the same time the plate can be easily removed with a little heat or stripped off cold when the job is finished.

As an alternative construction for this rubber plate for some types of plates, the rubber or synthetic resin may employ fibers running in every direction but I prefer the form in which the fibers are arranged in a given direction at preferably right angles one to the other.

Vulcanization is effected in any one of the usual methods.

In the drawing I have indicated diagrammatically the fibers. Due to the difficulty of making a drawing of such small members as these fibers, it has been necessary to show them exaggerated as to size. In practice the fibers are very fine and may be either continuous long fibers or short fibers arranged all in the same direction.

It will be understood that I desire to comprehend within my invention such modifications as may be necessary to adapt it to varying conditions and uses.

Having thus fully described my invention, what I claim as new and desire to secure by Letters Patent, is:

1. In a printing plate, the combination of rubber and fibers arranged in one substantially single direction, a second layer of rubber and fibers arranged in another substantially single direction, and a third layer composed of synthetic rubber.

2. In a printing plate, the combination of rubber and fibers arranged in one substantially single direction, a second layer of rubber and fibers arranged in another substantially single direction only, the fibers in the two sets being arranged at right angles to one another, and a third, outer, layer composed of synthetic rubber.

3. In a printing plate, the combination of rubber and fibers arranged in one substantially single direction, a second layer of rubber and fibers arranged in another substantially single direction, a third, outer, layer of synthetic rubber on one side of said first and second layers, and a pre-shrunk fabric backing for said plate on the other side of said first and second layers.

4. In a printing plate, the combination of rubber and fibers arranged in one substantially single direction, a second layer of rubber and fibers arranged in another substantially single direction, said fibers being arranged at right angles to one another, a third, outer, layer of synthetic rubber on one side of said first and second layers, and a pre-shrunk fabric backing for said plate.

5. In a printing plate, the combination of a layer of rubber and fibers arranged in one substantially single direction, and a second layer of rubber and fibers arranged in another substantially single direction, and a coating of synthetic rubber.

6. In a printing plate, the combination of a layer of rubber and fibers arranged in one substantially single direction, a second layer of rubber and fibers arranged in another substantially single direction, a pre-shrunk fabric backing on one side of said plate, and a coating of resilient oil resistant synthetic resin on the other side of said plate.

7. In a printing plate, the combination of a layer of rubber and fibers arranged in one substantially single direction, a second layer of rubber and fibers arranged in another substantially single direction, said fibers being arranged at right angles to one another, a pre-shrunk fabric backing on one side of said plate, and a coating of resilient synthetic resin on the other side of said plate.

8. In a rubber printing plate, a plurality of layers of resilient synthetic resinous oil and acid resistant material having fibers arranged therein in each layer in a predetermined substantially single direction, the fibers in different layers being arranged at angles to one another.

9. In a rubber printing plate, a plurality of layers of synthetic rubber material having fibers arranged therein in each layer in a predetermined substantially single direction, the fibers in different layers being arranged at angles to one another, and a pre-shrunk fabric backing therefor.

10. In a printing plate, the combination of a pre-shrunk fabric backing, a non-shrinkable body vulcanized thereto, and a synthetic rubber coating.

11. In a printing plate, the combination of layers of resilient material having fibers arranged in each layer in the same single direction and the single-directed fibers of the several layers arranged at angles to one another, and a synthetic rubber solution coating on one of the outer layers whereby the surface of the plate is impervious to acids, solvents, inks and the like that would affect rubber.

12. In a method of manufacturing a printing plate, incorporating fibers arranged all in one substantially single direction in a layer of resilient synthetic resin, superimposing a similar layer with the fibers arranged all in another substantially single direction at right angles to the first mentioned fibers, reinforcing the plate on one side with a pre-shrunk fabric, and vulcanizing the whole together.

ABRAHAM L. FREEDLANDER.